United States Patent [19]

Smillie

[11] 4,090,995

[45] May 23, 1978

[54] PROCESS FOR HOT RESIN COATING OF SHELL SANDS USING SALICYLIC ACID

[75] Inventor: John G. Smillie, Aurora, Ill.

[73] Assignee: Aurora Metal Corporation, Aurora, Ill.

[21] Appl. No.: 759,878

[22] Filed: Jan. 17, 1977

[51] Int. Cl.² .............................................. C08L 61/06
[52] U.S. Cl. ............................. 260/38; 260/DIG. 40
[58] Field of Search .......................... 260/38, DIG. 40

[56] References Cited

U.S. PATENT DOCUMENTS 3,020,254  2/1962  Less et al. ............................... 260/38
3,692,733  9/1972  Johnson ................................... 260/38

Primary Examiner—Lewis T. Jacobs
Attorney, Agent, or Firm—Leydig, Voit, Osann, Mayer, & Holt, Ltd.

[57] ABSTRACT

A process for preparing a resin-coated sand for use in shell molds and cores comprises the steps of mixing the sand with phenolformaldehyde resin and an amount of salicylic acid comprising at least about 3% of the weight of the resin, the mixing being carried out at a temperature above the melting point of the resin so as to form a coating of the resin on the sand and cooling and setting the resin on the sand to solidify the resin coating. The hot mixture of sand and resin is quenched with a mixture of water and hexamethylenetetramine, and it is preferred that at least a portion of the salicylic acid, in an amount equal to at least about 1% of the weight of the resin, be added to the hot mixture of sand and resin in the quench liquid. The sand is heated to a temperature in the range of from about 270° F. to about 320° F. before the sand is mixed with the resin.

10 Claims, No Drawings

PROCESS FOR HOT RESIN COATING OF SHELL SANDS USING SALICYLIC ACID

DESCRIPTION OF THE INVENTION

The present invention relates generally to shell molding and, more particularly, to processes for preparing resin-coated sand for use in forming shell molds and cores.

It is a primary object of the present invention to provide a process for preparing an improved resin-coated shell sand which is capable of forming shell molds and cores in shorter times and/or at lower temperatures than required by previous shell sands. In this connection, a related object of the invention is to provide such a process that increases the production rate and/or reduces the energy requirements of any given machine for forming shell molds or cores.

A further object of the invention is to provide a process for preparing an improved resin-coated shell sand which reduces the cost of shell molds and cores formed therefrom.

Another object of the invention is to provide a process for preparing such an improved resin-coated sand which produces shell molds and cores with relatively sharp corners and uniform thicknesses, thereby minimizing the amount of sand required.

Still another object of the invention is to provide an improved process for preparing resin-coated shell sands with less resin than was required in previous shell sands for comparable performance.

Other objects and advantages of the invention will be apparent from the following detailed description.

Although the invention will be described in connection with certain preferred embodiments, it will be understood that it is not intended to limit the invention to these particular embodiments. On the contrary, it is intended to cover all alternatives, modifications and equivalents that may be included within the spirit and scope of the invention as defined by the appended claims.

In accordance with the present invention, there is provided a process for preparing a resin-coated sand for use in shell molds and cores, the process comprising the steps of mixing the sand with phenolformaldehyde resin and an amount of salicylic acid comprising at least about 3% of the weight of the resin, the mixing being carried out at a temperature above the melting point of the resin so as to form a coating of the resin on the sand; and cooling and setting the resin on the sand to solidify the resin coating.

Phenolformaldehyde resin has been widely used heretofore in the coating of shell sands. This resin has been applied to the sand by at least two different techniques, namely by a hot coating technique in which initially solid resin is melted while being mixed with the sand, and by a cold coating technique in which initially solid resin is dissolved in a solvent which is then mixed with the sand. In both the cold and the hot coating techniques as practiced previously an aromatic monocarboxylic acid, such as salicylic acid, has been added to shorten the curing time and improve the tensile strength. Such a cold coating process is described, for example, in U.S. Pat. No. 3,020,254 to F. W. Less et al., which includes data showing that the time required to cure the resin was reduced substantially by the addition of salicylic acid in amounts up to 3% of the resin; greater additions of salicylic acid produced only minor further reductions in curing time. In commercial practice, the phenolic resins made for use in both the hot and cold coating processes have generally contained from 2% to 2.5% by weight salicylic acid.

The present invention stems from the discovery that the use of greater amounts of salicylic acid in a hot coating process results in significant further improvements in the resin-coated sand, particularly when at least a portion of the salicylic acid is added in the quenching liquid that is used to cool and set the resin after it has been mixed with the sand. Thus, it has been found that the addition of salicylic acid to a hot sand-resin mixture in amounts greater than about 3% of the weight of the resin permits the cure time of the shell molds and cores to be reduced by as much as 50%, with corresponding savings in machine time and consequent increased production rates and reduced costs. If the cycle time cannot be reduced sufficiently to take full advantage of the reduced cure time, then a reduced pattern temperature may be used to save energy.

It has also been found that the improved shell sand made by this invention produces improved tensile strengths, which means that a smaller amount of resin may be used for any given application. Moreover, shell molds and cores produced from this improved sand have relatively sharp corners and uniform thicknesses, which minimizes the amount of sand required and further reduces production costs.

The sand is typically heated to a temperature in the range of from about 270° F to about 320° F., preferably 280° F to 300° F., before it is mixed with the resin. The phenolformaldehyde resin, typically in the form of solid flakes, is then mixed with the heated sand in a conventional muller. During an initial mixing period, typically 60 to 90 seconds, the resin is melted and forms a coating on the sand. Quenching water containing hexamethylenetetramine, along with a wax additive if desired, is then added to the muller to cool and cure the resin coating on the sand grains, after which the mixing is continued for a secondary mixing period, typically 30-60 seconds, to obtain uniform solidification of the resin coating on the sand grains throughout the entire mass within the muller. The temperature of the coated sand is reduced during the secondary mixing period due to the quenching effect of the water and hexamethylenetetramine.

It is preferred to add at least 1% salicylic acid, based on the weight of resin employed, with the quenching liquid that is mixed with the sand and resin after the resin has been melted and coated on the sand. If desired, all the salicylic acid may be added in the quenching liquid. The salicylic acid is solid at room temperature, and can be added as a powder loaded directly into the muller or premixed with the quench water.

The forming of a shell mold or shell core with the resin-coated sand prepared by the process of this invention is carried out in conventional hot patterns or core boxes. As is well known to those familiar with shell molding, the forming of a shell mold or core normally involves a blowing or dumping step in which the resin-coated sand is applied to the surface of the pattern or core box, a dwell or invest step during which the sand is compacted on the surface of the pattern or core box, and a curing step during which the resin is solidified to provide an integral shell mold or core which can be removed from the pattern or core box. The time required for these successive steps varies widely depending on the type of investment procedure and equipment utilized, as well as the size and shape of the mold or core. However, regardless of what type of procedure and equipment is utilized, the process of the present invention permits significant reductions in the time required for both the invest step and the curing step, thereby providing significant reductions in the total cycle time involved in the forming of any given shell mold or core.

The following working examples are given as illustrations of the invention and are not intended to limit the scope of the invention. The results of certain tests conducted on the coated sands are also described. These tests were made substantially in accordance with the following procedures:

Cold tensile strength

A Dietert# 400-1 motor driven, arc type strength machine (made by Harry W. Dietert Co., Detroit, Mich.) with a Dietert #610-N tensile core strength accessory is used to break specimen sand "biscuits" formed in a pattern at 450° F., cured for 1 minute, and then cooled to room temperature. The cold tensile strength in psi is read directly from the shear scale on the machine.

Hot tensile strength

A Dietert #365 hot shell tensile tester with a #366 timer accessory is used to break a hot sand specimen formed in a pattern at 450° F., and cured for a predetermined period. The machine automatically breaks the specimen at the end of the predetermined curing period and shuts off. The hot tensile strength in psi in read directly from the dial on the machine.

Stick point

A Dietert #370 melt point apparatus with a #371 air brush accessory is used with the air pressure for the brush maintained at 5.5 psi and the vertical distance from the tip of the air brush to the top surface of the heated bar maintained at 1.25 inches. The sand is dumped along the centerline of the bar and allowed to heat for 1 minute. The air brush is then moved up and down the bar one time, starting at the hot end of the bar, and the weighted constant and pointer is placed on the bar where the sand grains first begin to stick to the bar. The stick point of the sand in ° F. is read directly from the pyrometer on the apparatus.

Loss on Ignition

Two grams of the shell sand to be tested are placed in a pre-weighted boat, and the boat and sand are then placed in a muffle furnace maintained at 1700° F and heated for 45 minutes. The boat and sand are then removed from the furnace, allowed to cool to room temperature, and weighed again. The final weight of the boat and sand is subtracted from the initial weight of the boat and sand, and the resulting difference is divided by 2 and multiplied by 100 to obtain the percent loss on ignition.

Peel

The shell sand is spread onto a flat 7 inch-diameter steel disc maintained at 410° F. ± 10° F. for 90 seconds, and then inverted for 2 minutes. Measurements are made of the thickness of the peel and the time elapsed before the peel occurred.

Build up

The weight of sand adhered to the steel disc in the peel test is measured in grams.

In the following examples sands A, B, C, and D were prepared by preheating Wedron 65AFS sand to a temperature in the range of 275° to 290° F. (290° F. for sand A, 275° F. for sands B and C, and 285° F. for sand D); loading 900 pounds of the heated sand into a conventional Barber Green muller along with 22.5 pounds of phenolformaldehyde resin in the form of solid flakes; mixing the sand and resin in the muller for 75 seconds; quenching the resulting mixture with 17 pounds of water containing 3 pounds and 6 ounces of hexamethylenetetramine and 4 ounces of wax; mixing for another 45 to 60 seconds; and then drying, crushing and sizing the resulting cooled sand. In sand A, no salicylic acid was added in either the resin or the quench water. In sands B, C and D the resin contained 2%–2.5% by weight salicylic acid, and the quench water contained 0, 1.5%, and 3.0% by weight salicylic acid (based on the amount of resin) in sands B, C and D, respectively. Sand A is a prior art sand made by the assignee of the present invention, and sand B is similar to prior art sands made by other manufacturers, i.e., made from phenolic resin containing 2%–2.5% salicylic acid in a hot coating process.

Sands A, B, C and D were tested for cold tensile strength ("C.T."); hot tensile strength after one minute ("H.T. 1 min.") and three minutes ("H.T. 3 min."); stick point ("S.P."); loss on ignition ("L.O.I."); build-up; and peel.

The results of these tests were as follows:

|  | Sand A | Sand B | Sand C | Sand D |
|---|---|---|---|---|
| C.T. | 558 | 573 | 583 | 641 |
| H.T. 1 min. | 114 | 104 | 132 | 156 |
| H.T. 3 min. | 350 | 338 | 373 | 334 |
| S.P. | 228 | 227 | 227 | 223 |
| L.O.I. | 2.73 | 2.70 | 2.80 | 2.70 |
| Build Up - Grams | | | | |
| 15 sec. | 142 | 160 | 201 | 170 |
| 30 sec. | 210 | 232 | 238 | 259 |
| 45 sec. | 260 | 295 | 311 | 354 |
| 60 sec. | 312 | 349 | 351 | 346 |
| 90 sec. | 397 | 446 | 389 | 372 |
| 120 sec. | 471 | 491 | 460 | 491 |
| Thickness Of Peel | | | | |
| 30 sec. | .0245 | .0262 | .0306 | .0298 |
| 60 sec. | .0348 | .0385 | .0393 | .0389 |
| 120 sec. | .0550 | .0518 | .0507 | .0540 |

It can be seen from the above data that the sands prepared by the process of the present invention (sands C and D) produced improved tensile strengths, thereby permitting the use of a smaller amount of resin for any given application.

Next, sands A, B, C and D and three commercially available shell sands were used in an actual foundry to prepare shell cores at core box temperatures of 550° F to 600° F., with the following results:

|  | Blow | Dwell | Cure | Weight of Core | Total Machine Time |
|---|---|---|---|---|---|
| Manley | | | | | |

-continued

|  | Blow | Dwell | Cure | Weight of Core | Total Machine Time |
|---|---|---|---|---|---|
| Quick-Vest | 2 sec. | 19 sec. | 20 sec. | 1 lb. 2 oz. | 41 sec. |
| Manley MA3-6 | 2 sec. | 22 sec. | 40 sec. | 1 lb. 1.5 oz. | 64 sec. |
| Acme Super "F" ®3%-GP | 2 sec. | 20 sec. | 40 sec. | 1 lb. 2 oz. | 62 sec. |
| Sand A | 2 sec. | 22 sec. | 40 sec. | 1 lb. 1.5 oz. | 64 sec. |
| Sand B | 2 sec. | 22 sec. | 25 sec. | 1 lb. 1 oz. | 49 sec. |
| Sand C | 2 sec. | 17 sec. | 17 sec. | 1 lb. 1 oz. | 36 sec. |
| Sand D | 2 sec. | 17 sec. | 17 sec. | 1 lb. 1 oz. | 36 sec. |

It can be seen from the above data that the improved shell sands of the present invention (sands C and D) reduced the total machine time by about 12%, 26%, 42% and 44% as compared with the competitive sands. These reductions in machine cycle time translate into significant increases in production rates and corresponding cost reductions. Moreover, the sands of the present invention produced relatively sharp corners and uniform thicknesses, which resulted in cores of somewhat lower weight than the other sands, thereby providing savings in the amount of sand consumed.

For further comparative foundry tests, five additional sands were prepared using the same process described above but with the following compositional changes:

Sand E had the same composition as sand D but 2% salicylic acid, instead of 1.5%, was added in the quench water.

Sands F and G were made with the same percentage of salicylic acid as sand E but with the resin content increased to 3.0% and 3.5%, respectively.

Sands H and I were the same as sand A but with the resin content increased to 3.5% and 4%, respectively.

The results of the additional foundry tests using these sands were as follows:

FOUNDRY NO. 1

|  | Blow | Dwell | Cure | Weight Of Core | Temp. | Total Machine Time |
|---|---|---|---|---|---|---|
| Sand A | 10 sec. | 60 sec. | 195 sec. | 24 lb. no peel | 525° F. | 265 sec. |
| Sand E | 10 sec. | 45 sec. | 90 sec. | 23.5 lb. no peel | 525°0 F. | 145 sec. |
| ACME D6-2.5-1131F | 10 sec. | 60 sec. | 195 sec. | 23.5 lb. no peel | 525° F. | 265 sec. |

FOUNDRY NO. 2

|  | Blow | Dwell | Cure | Weight Of Core | Temp. | Total Machine Time |
|---|---|---|---|---|---|---|
| ACME Super "F" ® | 3 sec. | 32 sec. | 115 sec. | 4 lb. 4 oz. | 550–650° F. | 150 sec. |
| Sand F | 3 sec. | 42 sec. | 65 sec. | 4 lb. 2 oz. | 500–575° F. | 110 sec. |

FOUNDRY NO. 3

|  | Blow | Dwell | Cure | Weight Of Core | Total Machine Time |
|---|---|---|---|---|---|
| Sand I | 20 sec. | 114 sec. | 55 sec. | 45 lb. | 189 sec. |
| Sand G | 20 sec. | 114 sec. | 55 sec. | 50 lb. | 189 sec. |
| Sand G | 20 sec. | 90 sec. | 40 sec. | 42 lb. | 150 sec. |

FOUNDRY NO. 4

|  | Blow | Dwell | Cure | Weight Of Core | Temp. | Total Machine Time |
|---|---|---|---|---|---|---|
| Shell Sands In Production (06-451) | 18 sec. | 150 sec. | 70 sec. | 31 lb. | 400° ± 25° ± | 238 sec. |
| Sand G | 18 sec. | 150 sec. | 70 sec. | 35 lb. | 400° ± 25° ± | 238 sec. |
| Sand G | 18 sec. | 100 sec. | 50 sec. | 31 lb. | 400° ± 25°± | 168 sec. |

FOUNDRY NO. 5

|  | Dwell | Cure | Wall Section | Weight Of Core | Temp. | Total Machine Time |
|---|---|---|---|---|---|---|
| Sand H | 120 sec. | 120 sec. | ⅞" | 100 lb. Avg. | 480° F. | 240 sec. |
| Sand G | 75 sec. | 105 sec. | ⅞" | 100 lb. Avg. | 480° F. | 180 sec. |

FOUNDRY NO. 6

|  | Blow | Dwell | Rock & Drain | Cure | Temp. | Weight Of Core | Total Machine Time |
|---|---|---|---|---|---|---|---|

| | | | | | | | |
|---|---|---|---|---|---|---|---|
| Manley MA-735W | 2 sec. | 25 sec. | 11 sec. | 46 sec. | 550° F. | 3 lb. 8 oz. | 84 sec. |
| Sand E | 2 sec. | 15 sec. | 6 sec. | 35 sec. | 485° F. | 3 lb. 9 oz. | 58 sec. |

It can be seen from the above data that the improved shell sands of the present invention (sands E, F and G) resulted in significant reductions in cure time and machine time, and also permitted the use of less resin in certain applications. More specifically, in Foundry No. 1, sand E reduced the cure time by 54% and reduced the machine time by 45%. In Foundry No. 2, sand F resulted in a 48% reduction in cure time and a 26% reduction in machine time. In Foundry No. 3, one of the tests with sand G resulted in a 27% reduction in cure time and a 20% reduction in machine time; furthermore, sand G contained only 3.5% resin as compared with the 4% resin contained in sand I. In Foundry No. 4, one of the tests with sand G produced a 28% reduction in cure time and a 29% reduction in machine time. In Foundry No. 5, sand G yielded a 25% reduction in machine time as a result of reductions in both the dwell and cure time. In Foundry No. 6, sand E contained less resin than the other sand and still resulted in reductions of 40% in the dwell time, 24% in the cure time, and 31% in the machine time.

I claim as my invention:

1. A process for preparing a resin-coated sand for use in shell molds and cores, said process comprising the steps of
   (a) mixing the sand with phenolformaldehyde resin and an amount of salicylic acid comprising at least about 3% of the weight of the resin, said mixing being carried out at a temperature above the melting point of said resin so as to form a coating of the resin on the sand,
   (b) and cooling and setting the resin on the sand to solidify the resin coating.

2. A process for preparing a resin-coated sand as set forth in claim 1 wherein the hot mixture of sand and resin is quenched with a mixture of water and hexamethylenetetramine.

3. A process for preparing a resin-coated sand as set forth in claim 2 wherein at least a portion of said salicylic acid, in an amount equal to at least about 1% of the weight of said resin, is added to the hot mixture of sand and resin in said mixture of water and hexamethylenetetramine.

4. A process for preparing a resin-coated sand as set forth in claim 1 wherein the sand is heated to a temperature in the range of from about 270° F. to about 320° F. before the sand is mixed with the resin.

5. A process for preparing a resin-coated sand for use in shell molds and cores, said process comprising the steps of
   (a) heating the sand to a temperature in the range of from about 270° F. to about 320° F.,
   (b) mixing the heated sand with phenolformaldehyde resin and an amount of salicylic acid comprising at least about 2% of the weight of the resin to form a liquid coating of the resin on the sand,
   (c) and quenching the resin-coated sand with a mixture of water, hexamethylenetetramine and an amount of salicylic acid comprising at least about 1% of the weight of the resin, to cool and set the resin coating.

6. A process for preparing a shell mold or core, said process comprising the steps of
   (a) mixing the sand with phenolformaldehyde resin and an amount of salicylic acid comprising at least about 3% of the weight of the resin, said mixing being carried out at a temperature above the melting point of said resin so as to form a coating of the resin on the sand,
   (b) cooling and setting the resin on the sand to solidify the resin coating,
   (c) forming a shell mold or core from the resin-coated sand,
   (d) and heating the sand forming the shell mold or core to fuse the resin coating and bond the sand particles together.

7. A process for preparing a shell mold or core as set forth in claim 6 wherein the hot mixture of said and resin is quenched with a mixture of water and hexamethylenetetramine.

8. A process for preparing a shell mold or core as set forth in claim 7 wherein at least a portion of said salicylic acid, in an amount equal to at least about 1% of the weight of said resin, is added to the hot mixture of sand and resin in said mixture of water and hexamethylenetetramine.

9. A process for preparing a shell mold or core as set forth in claim 6 wherein the sand is heated to a temperature in the range of from about 270° F. to about 320° F. before the sand is mixed with the resin.

10. A resin-coated sand for use in shell molds and cores, said sand being produced by:
    (a) mixing the sand with phenolformaldehyde resin and an amount of salicylic acid comprising at least about 3% of the weight of the resin, said mixing being carried out at a temperature above the melting point of said resin so as to form a coating of the resin on the sand,
    (b) and cooling and setting the resin on the sand to solidify the resin coating.

* * * * *